Feb. 16, 1943. N. E. WAHLBERG 2,311,143
TORQUE TUBE DRIVE
Filed May 22, 1940 2 Sheets-Sheet 1
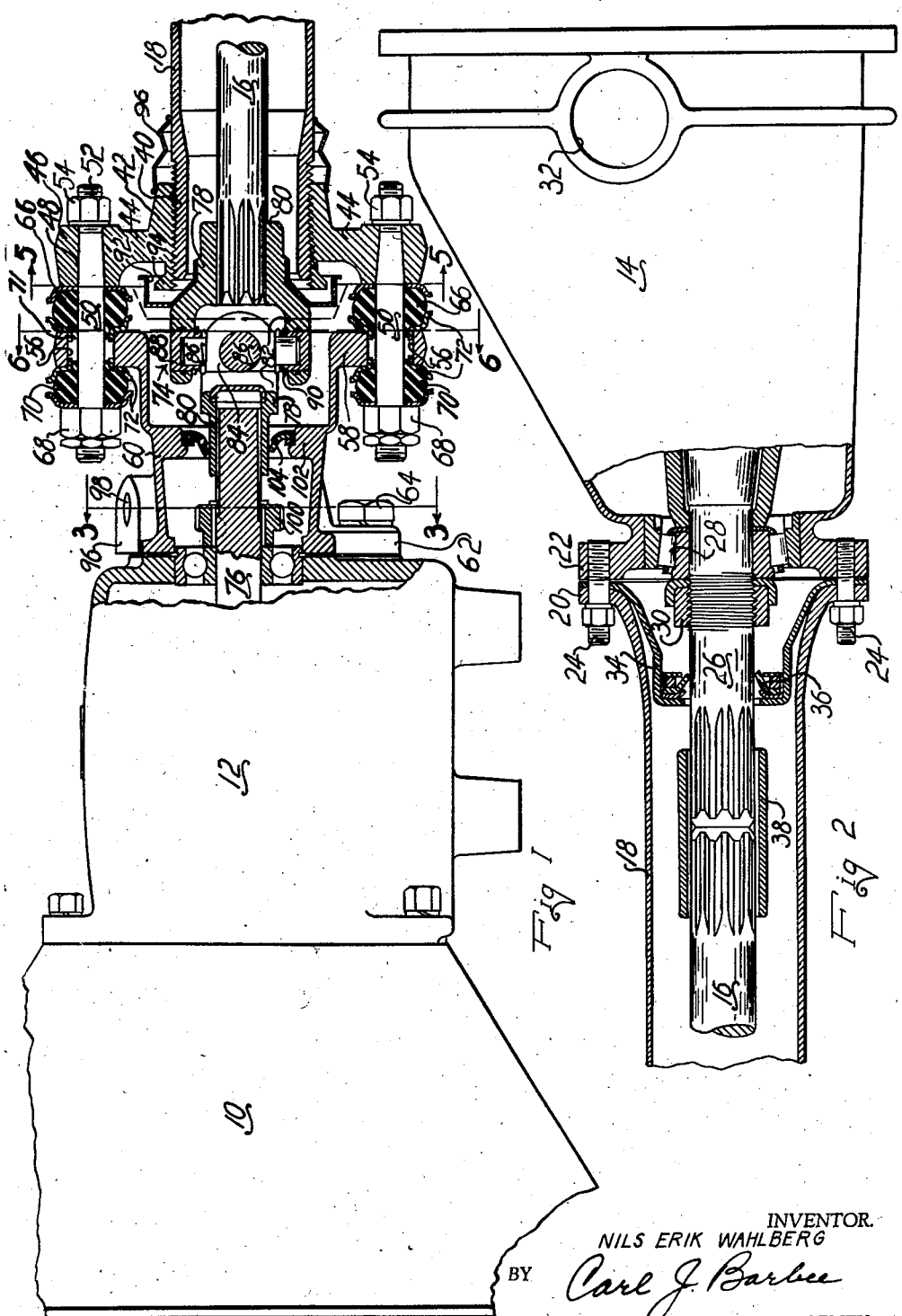
INVENTOR.
NILS ERIK WAHLBERG
BY Carl J. Barbee
ATTORNEY.

INVENTOR.
NILS ERIK WAHLBERG
BY Carl J. Barbee
ATTORNEY.

Patented Feb. 16, 1943

2,311,143

UNITED STATES PATENT OFFICE 2,311,143

TORQUE TUBE DRIVE

Nils Erik Wahlberg, Kenosha, Wis., assignor to Nash-Kelvinator Corporation, Kenosha, Wis., a corporation of Maryland Application May 22, 1940, Serial No. 336,604

20 Claims. (Cl. 180—73)

This invention relates to torque tube construction and has particular reference to means for connecting the torque tube housing the drive shaft in an automotive vehicle to the power unit of the vehicle.

It is an object of this invention to provide a torque tube connection which will permit the driving force from the wheels of an automobile to be transmitted directly to the power unit and from there to the vehicle frame.

It is another object of this invention to provide novel means for cushioning the connection between the torque tube and the power unit, which connection will prevent the transmission of vibrations therethrough.

It is another object of this invention to provide a torque tube connection which will permit the torque tube to move with the driving wheels and at the same time transmit the driving force to the frame of the vehicle.

It is another object of this invention to provide torque tube connection in which the torque tube may rotate about its axis independently of any vertical movement of the torque tube with respect to the car frame.

Other objects and advantages of this invention will be apparent from a consideration of the following specification and claims and the attached drawings of which there are two sheets and in which—

Figure 1 represents a plan view partially in section of the connection between the torque tube and propeller shaft of an automobile to the power unit of the automobile;

Figure 2 represents an elevational view partially in section of the rear end of the torque tube as connected to a differential;

Figure 3:
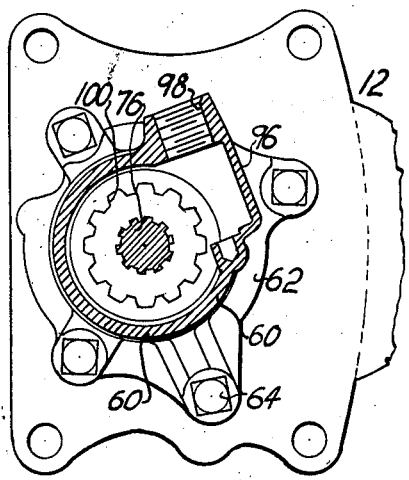
Figure 3 represents a section taken along the plane indicated by the line 3—3 in Figure 1 and looking in the direction of the arrows.

In the drawings I have illustrated a power plant including a motor 9, a clutch housing 10 and transmission housing 12. The power is delivered from the transmission 12 to a differential 14 by means of a propeller shaft 16 housed within the torque tube 18. The torque tube 18 is flanged as at 20 at its rearward end and rigidly secured to a flange 22 on the differential housing 14 by means of bolts 24. The differential may be constructed in any suitable manner known to the art today, and I have shown it to include a stub shaft 26 journaled in roller bearings 28 which are retained in races held in place by means of a nut 30 screwed on a threaded portion of the shaft 26. The differential shaft 26 is arranged to operate through suitable gearing to turn axles (not shown) which extend through the apertures 32 formed on each side of the housing 14. The flanges 20 and 22 may have secured between them a cup-shaped stamping 34 which supports a seal 36 around the forward end of shaft 26 for preventing the escape of differential lubricant to the torque tube 18. The shaft 26 is connected to the propeller shaft 16 by means of an internally splined sleeve 38 which fits over the splined ends of the shafts 16 and 26. From the above description it should be apparent that the propeller shaft 16 and torque tube 18 will rise and fall as the wheels of the vehicle pass over uneven ground. The torque tube and shaft will also be subjected to a rotative movement when one wheel rises above or falls below the level of the other wheel. It is toward accommodating these movements of the torque tube and propeller shaft that my connection is directed.

Figure 5:
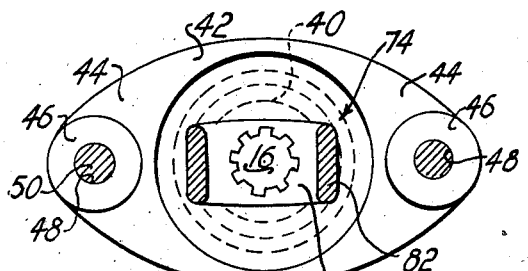
Figure 5 represents a section taken along a plane indicated by the broken line 5—5 of Figure 1 and looking in the direction of the arrows.
Figure 4:
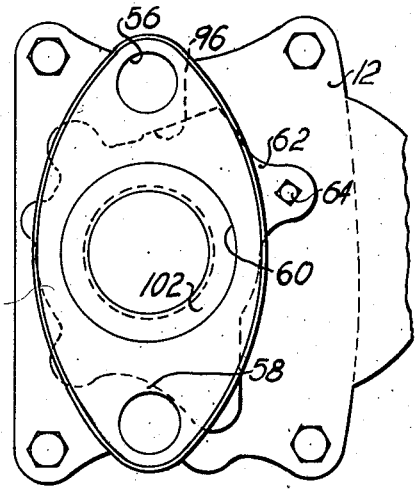
Figure 4 represents a rear elevation of the power unit illustrated in Figure 1 and with a portion of the connecting means in position thereon.
Figure 6:
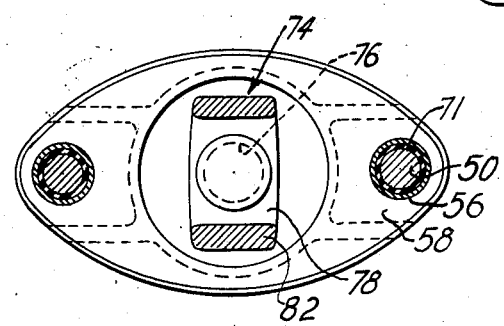
Figure 6 represents a section taken along a plane indicated by the line 6—6 in Figure 1 and looking in the direction of the arrows; and, Figure 7 represents a side elevation, partially broken away, of an automobile chassis showing a torque tube connected between the power plant and differential.

As is illustrated in Figure 1, the forward end of the torque tube 18 is slightly thickened and externally threaded at 40. The threaded portion 40 receives the internally threaded trunnion 42 which is generally oval-shaped (see Figure 5) forming two arms 44, one on each side of the trunnion. The arms 44 carry at their outer ends the thickened bosses 46 which are pierced at 48 by holes which taper toward a smaller diameter at the rear surfaces of the bosses 46. Apertures 48 receive the tapered ends of pins 50 which have a threaded portion 52 extending to the rear of the bosses 46 and on which are threaded the nuts 54.

The mating threads within trunnion 42 and upon torque tube 18 are of a very coarse nature and are cut so as to provide considerable clearance therebetween in order that no resistance is offered to relative rotation of the torque tube within the trunnion 42.

The pins 50 extend forwardly of the trunnion 42 and pass through apertures 56 formed in the rear flange 58 of a generally tubular member 60. Tubular member 60 is provided with a forward flange 62 which is rigidly secured to the rear wall of the transmission housing 12 by means of cap screws 64.

Thrust from the torque tube 18 and trunnion 42 is delivered to the tubular member 60 and the transmission housing 12 through two rubber biscuits 66 positioned between the bosses 46 and the flange 58 of the tubular member 60 and around the pins 50. The pins 50 are retained in the apertured portions 56 of the tubular member 60 and drag forces in the tube 18 are transmitted to the transmission 12 by means of nuts 68 threaded on the forward ends of the pins. The nuts 68 and the pins 50 are further cushioned from the tubular member 60 by a second set of rubber biscuits 70 positioned between the nuts 68 and the forward surface of the flange 58. Both the biscuits 66 and 70 are provided with cup-shaped metal washers 72 for distributing the loads throughout the washers and preventing wear.

Attention is called to the fact that the apertures 56 are of larger diameter than the pins 50 so that the pins may tip relative to the flange 58 without binding. The two center washers 72 on each side of the flange 60 and the rubber biscuits 70 are provided with short flanges as at 71 which fit between the pins 50 and the sides of apertures 56 and prevent the pins from moving radially with respect to the apertures.

It is thus evident that there is no continuous metallic connection between the torque tube 18 and the tubular member 60 through which vibration can be transmitted to the transmission housing 12. I wish to particularly point out that the apertures 56 in the flange 58 of the tubular member 60 and the apertures 48 in the trunnion 42 are positioned in a substantially horizontal plane transversely of the automobile. The yielding character of the rubber biscuits 66 and 70 allow the pins 50 and trunnion 42 to rotate in a vertical plane about a horizontal axis extending transversely through the centers of apertures 56. This rotative movement accommodates the rising and falling of the rear axle, and since the torque tube 18 is usually of considerable length, the movement of the trunnion is so small as to be well within the limits of movement allowed by the rubber biscuits. The threaded connection between the torque tube 18 and trunnion 42 will permit the torque tube to rotate with respect to the trunnion when one wheel moves above or below the other as described above.

The driving connection between the propeller shaft 16 and transmission 12 is provided by a universal joint generally indicated at 74 which is mounted on the splined ends of the propeller shaft 16 and the transmission shaft 76 which extends into the tubular member 60. The universal joint 74 consists of two yoke members 78 having hollow, internally splined shanks 80 and the apertured arms 82. A cross member 84 has four shafts 86 formed thereon which are journaled in bushings 88 positioned in the apertures in the arms 82. Bushings 88 are closed at their outer ends and are provided with snap rings 90 for retaining them in the apertures of arms 78. The universal joint 74 is positioned so that the center of the cross 84 is located on a line passed through the centers of apertures 56 in the flange 58 and in the center of the tubular member 60. In this manner the torque tube 18 and the propeller shaft 16 will pivot about the same point and be kept in axial alignment.

The yoke 78 carried on the propeller shaft 16 carries a flanged cup-shaped member 92 which surrounds a flange 94 formed on the end of the trunnion 42. The flange 94 causes any dust entering between the torque tube 18 and yoke 78 to impinge on the cup 92. Since cup 92 is rotated with the propeller shaft, it acts as a slinger ring and tends to keep dirt and dust from entering the torque tube. A rubber bellows 96 is positioned around the torque tube 18 and extends between the tube and the end of the trunnion to keep dust and moisture from the threads 40.

The tubular member 60 has formed on one side thereof, adjacent the forward flange 62, a boss 96. The boss 96 is hollow (see Figure 3) and is provided with a tapped hole 98 which opens tangentially into the tubular member 60. The hole 98 is arranged to receive and hold a speedometer cable connection (not shown) by means of which a speedometer is driven from a gear 100 keyed to shaft 76 within the tubular member 60. Just back of the boss 96, the tubular member 60 is provided with an internal annular flange 102 which supports a leather or fabric seal 104. The seal 104 slides on the shank 80 of the forward yoke member 78 and seals the inside of tubular member 60 and speedometer gear 100 from dirt and dust.

It will be noted that the above mechanism including the tubular member 60 with its speedometer connection, universal joint 74 and trunnion 40 may be attached to the rear wall of a transmission case as shown or to an overdrive housing which is added to the transmission. All that is necessary to make the parts interchangeable in cars with or without overdrive is to provide two lengths of drive shaft and torque tube. The speedometer will always attach behind the last set of transmission or overdrive gears and will be driven at propeller shaft speed.

Figure 7:
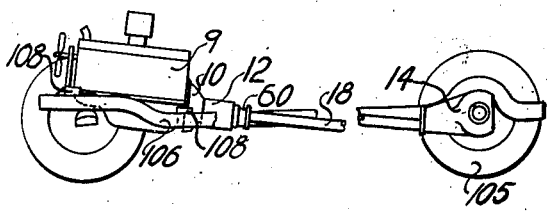

In Figure 7 I have illustrated generally how my torque tube connection may be used to transmit driving thrust of wheels 105 to the frame 106 of an automobile. The propeller shaft 18 is shown connected, as described above, between the differential housing 14 and the tubular connecting member 60 which is mounted on the transmission case 12. The transmission case 12 is secured to the clutch housing 10 on the motor 9. Motor 9 is supported on the frame 106 by means of the brackets or motor mounting blocks 108. The blocks 108 may be of any type which is capable of transmitting horizontal as well as vertical loads. The motor support blocks 108 thus support the engine and transmit driving thrust and braking force to the frame 106.

While I have described my invention in some detail, I intend this description to be an example only and not limiting on my invention to which I make the following claims:

1. In an automobile having a propeller shaft arranged to operate within a torque tube rigidly fastened to a differential housing, a transmission having a shaft extending therefrom, a universal joint connecting said propeller shaft and said transmission shaft, a trunnion threaded on said torque tube, a connecting member secured to said transmission, a pair of bolts connecting said trunnion and said connecting member, and flexible means surrounding said bolts and spacing said bolts and trunnion from the connecting member.

2. In an automobile having a propeller shaft arranged to operate within a torque tube rigidly secured to a differential housing, a trunnion supported upon the forward end of said torque tube for rotation relative to said torque tube, a power unit for said automobile, means supported by said power unit defining a pair of apertures spaced along a line extending horizontally and transversely of said automobile, clamping means extending from said trunnion and passing through said apertures, and deformable cushioning means positioned between said trunnion and said aperture defining member.

3. In an automobile having a propeller shaft arranged to operate within a torque tube rigidly secured to a differential housing, a trunnion supported upon the forward end of said torque tube for rotation relative to said torque tube, a power unit for said automobile, means supported by said power unit defining a pair of apertures spaced along a line extending horizontally and transversely of said automobile, clamping means extending from said trunnion and passing through said apertures, deformable cushioning means positioned between said trunnion and said aperture defining member, and a second deformable cushioning means positioned between said clamping means and said aperture defining means.

4. In an automobile having a propeller shaft arranged to operate within a torque tube rigidly secured to a differential housing, a trunnion rotatably supported on the free end of said torque tube and having a portion engaging said torque tube to receive thrust forces from said torque tube, a power unit for said automobile, means carried by said power unit defining a pair of horizontally spaced apertures, a pair of bolts of smaller diameter than said apertures positioned in said apertures, flexible cushioning means positioned around said bolts on each side of said aperture defining means and having flanges positioned in said apertures and spacing said bolts from the walls of said apertures, ears formed on said trunnion, said bolts being passed through said ears, and means on each end of said bolts for drawing said ears, cushioning means and aperture defining means together.

5. In an automobile having a propeller shaft and a drive shaft, a universal joint connecting said shafts, a torque tube positioned around said propeller shaft, a tubular member positioned around an end of said drive shaft, a trunnion supported on said torque tube and arranged to rotate relative to said torque tube, means for connecting said trunnion and said tubular member along a horizontal line, and flexible means interposed between said connecting means and said tubular member.

6. In an automobile having a propeller shaft and a drive shaft, a universal joint connecting said shafts, a torque tube positioned around said propeller shaft, a tubular housing positioned around said drive shaft, means connecting said tubular member and said torque tube along a line passing through the center of movement of said universal joint, and flexible cushioning means interposed between said connecting means, tubular member and torque tube.

7. In an automobile having a propeller shaft arranged to operate within a torque tube rigidly secured to a differential housing, a power plant for said automobile having a drive shaft extending therefrom, a universal joint connecting said drive shaft and said propeller shaft, a gear carried on said drive shaft externally of said power plant, a housing positioned around said drive shaft and secured to said power plant, said housing defining an aperture opening tangentially along said gear, a seal carried by said housing between said gear and the end of said drive shaft, and means for flexibly connecting said housing to said torque tube along a horizontal line passing approximately through the center of said universal joint.

8. In an automobile having a torque tube rigidly connected to a differential housing, a fixed member on said automobile defining horizontally spaced apertures, rubber cushion members having holes therethrough positioned on each side of said apertures and having flanges extending into said apertures, a trunnion rotatively supported on the end of said torque tube, bolts passing through said apertures and the holes in said rubber cushioning members and clamping said trunnion to said fixed member, and driving shafts for said automobile, said driving shafts having a universal joint positioned along the line of said apertures.

9. A connecting member for joining the torque tube and transmission housing of an automobile comprising a tubular member, a flange on the forward end thereof, said flange defining a series of apertures, a flange formed on the rear end of said tubular member for defining a pair of apertures, one on each side of said tubular member, a hollow boss formed on the side of said tubular member, said boss being apertured to form a tapped hole extending tangentially into said tubular member, an annular flange formed around the inside of said tubular member intermediate of the ends thereof, and an annular seal carried by said annular flange.

10. In combination with a vehicle having a power unit and a spring mounted axle housing, a torque tube rigidly secured to said housing, a trunnion having a threaded connection with the free end of said tube and defining horizontally spaced apertures, horizontally spaced apertures formed in a portion of said power unit opposite the apertures in said trunnion, bolts passed through said apertures, said bolts being smaller than the apertures in said power unit, cushioning means carried around said bolts on each side of the apertures in said power unit, and a drive connection from said power unit to said axle housing having a universal joint positioned along the line of said apertures.

11. A torque tube to power unit connection comprising flanged members on said torque tube and power unit, horizontally spaced and axially aligned apertures formed in said flanged members, bolts through said apertures clamping said members together, said bolts being smaller than the apertures in at least one of said members, and deformable cushioning means spacing said bolts from the walls of said larger apertures.

12. A torque tube to power unit connection comprising flanged members on said torque tube and power unit, horizontally spaced and axially aligned apertures formed in said flanged members, bolts through said apertures clamping said members together, said bolts being smaller than the apertures in at least one of said members, and deformable cushioning means spacing said bolts from the walls of said larger apertures, the connection between one of said flanged members and its supporting part being rotatably threaded.

13. Power transmission means comprising two angularly arranged shafts in end-to-end relation connected by a universal joint, tubular elements telescoping said shafts and each arranged with its axis coincident with the axis of the shaft telescoped, a trunnion carried by one of said tubular elements and rotatable with respect thereto about the axis of said tubular element, and means connecting said trunnion to the other tubular element to permit slight angular movement between them.

14. A joint between two tubular members arranged in end-to-end relation for transmitting axially directed forces and permitting relative rotation of the tubular members comprising a fitting threaded upon one end of one tubular member and freely rotatable with respect thereto, a flange upon the other tubular member, pins extending from said fitting through enlarged apertures in said flange, and resilient means surrounding and spacing said pins from the walls of said apertures to permit angular movement between said pins and the walls of said apertures.

15. A joint between two tubular members arranged in end-to-end relation comprising a fitting carried by one of said members, pins secured in said fitting along a diameter of said first member and extending toward the other member, a flange upon said other member, apertures in said other member larger than said pins, said pins extending to and through said apertures in spaced relationship therewith, rubber cushions surrounding said pins on opposite sides of said flange and extending into said apertures and means clamping said cushions in position.

16. In an automobile having a propeller shaft arranged to operate within a torque tube, a trunnion having a threaded connection on the end of said torque tube, an annular flange formed on said trunnion, a cup shaped member carried by said propeller shaft and positioned around said annular flange, and a flexible bellows positioned around said torque tube and extending over the end of said trunnion opposite said annular flange to protect the threaded connection between said torque tube and trunnion.

17. In combination with an automobile having a propeller shaft arranged to operate within a torque tube, a trunnion having a loosely threaded connection with an open end of said torque tube, an annular groove formed in said trunnion about the open end of said torque tube, an annular flange formed on said trunnion about said torque tube and forming one side of said annular groove, and a cup shaped member carried by said propeller shaft, said cup shaped member extending over the open end of said torque tube and into said annular groove.

18. In combination with an automobile having a propeller shaft arranged to operate within a torque tube, a trunnion having a loosely threaded connection with an open end of said torque tube, an annular groove formed in said trunnion about the open end of said torque tube, an annular flange formed on said trunnion about said torque tube and forming one side of said annular groove, and a cup shaped member carried by said propeller shaft, said cup shaped member extending over the open end of said torque tube and into said annular groove and having an outturned flange formed on the outer edge thereof.

19. A universal connection for transmitting axially directed thrust and rotative power comprising a pair of shafts connected by a universal joint for transmitting rotative power, tubular members surrounding each of said shafts, a threaded connection between said tubular members permitting said members relatively to rotate about axes coincident with the axes of said shafts, and rubber cushioning members interposed in said connection and arranged to permit said tubular members to rotate limitedly about a horizontal axis transverse to the axes of said shafts, said cushioning means being arranged to transmit axially direct thrust, said tubular members being supported at their adjoining ends solely by their mutual connection.

20. In a motor vehicle, a rear axle housing, a drive shaft, a torque tube having one end secured to said housing and surrounding said drive shaft, and a connecting joint capable of transmitting axial thrust between said torque tube and a relatively fixed portion of said vehicle comprising, a first member having a rotatable but axial thrust transmitting connection with the other end of said torque tube, a second member having one end rigidly secured to said fixed portion of said vehicle and one end spaced from said first member longitudinally with respect to said vehicle, means connecting said members and positioned on each side of said tube and along a horizontal line extending transversely of said tube and including rubber gaskets arranged to permit angular movement of said tube limitedly about said line.

NILS ERIK WAHLBERG.